(12) United States Patent
Dannoux

(10) Patent No.: US 6,463,647 B1
(45) Date of Patent: Oct. 15, 2002

(54) METHOD OF MAKING AN EXTRUDED HIGH DENSITY ASSAY PLATE

(75) Inventor: Thierry L. A. Dannoux, Avon (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/259,822

(22) Filed: Mar. 1, 1999

Related U.S. Application Data

(60) Provisional application No. 60/079,931, filed on Mar. 30, 1998.

(30) Foreign Application Priority Data

Mar. 18, 1998 (EP) .............................. 98400636

(51) Int. Cl.[7] .............................. B65D 1/34; B65D 1/36; B23P 17/00
(52) U.S. Cl. .......................................... 29/417; 220/507
(58) Field of Search .............................. 29/417; 220/507

(56) References Cited

U.S. PATENT DOCUMENTS

| | | | |
|---|---|---|---|
| 3,234,639 A | * | 2/1966 | Dietzsch |
| 3,553,829 A | | 1/1971 | Hunt et al. .................... 29/592 |
| 3,593,856 A | * | 7/1971 | Zander |
| 3,728,186 A | | 4/1973 | Mohn ......................... 156/153 |
| 3,746,085 A | | 7/1973 | Andrysiak et al. .......... 165/172 |
| 3,941,157 A | * | 3/1976 | Barnett |
| 5,319,436 A | * | 6/1994 | Manns et al. |
| 5,424,219 A | * | 6/1995 | Jirikowski |
| 5,496,502 A | * | 3/1996 | Thomson |
| 5,602,197 A | | 2/1997 | Johnson ....................... 524/275 |
| 5,623,368 A | | 4/1997 | Calderini et al. ........... 359/619 |
| 5,759,494 A | * | 6/1998 | Szlosek |
| 5,858,309 A | * | 1/1999 | Mathus et al. |
| 5,961,926 A | * | 10/1999 | Kolb et al. |
| 5,989,854 A | * | 11/1999 | Cook |

FOREIGN PATENT DOCUMENTS

| | | |
|---|---|---|
| EP | 0 357 271 | 3/1990 |
| EP | 0 408 940 * | 1/1991 |
| GB | 2 054 897 | 2/1981 |

* cited by examiner

Primary Examiner—P. W. Echola
Assistant Examiner—Eric Compton
(74) Attorney, Agent, or Firm—Thomas R. Beall

(57) ABSTRACT

A method of making a multiwell plate involving joining a top plate that has been extruded and has a plurality of open ended channels, with a bottom plate that is substantially flat. The top plate forms the sidewalls of the wells of the plate and the bottom plate forms the bottoms of the wells. The resulting plate, which conforms to the industry standard footprint, has a potentially high density of wells, the volume of which may be controlled by the height of the plate.

17 Claims, 2 Drawing Sheets

METHOD OF MAKING AN EXTRUDED HIGH DENSITY ASSAY PLATE

This application claims the benefit of U.S. Ser. No. 60/079,931, filed Mar. 30, 1998.

FIELD OF THE INVENTION

The invention relates to a glass multiple well assay plate for applications in biological or chemical assays.

BACKGROUND OF INVENTION

The relationship between structure and function of molecules is a fundamental issue in the study of biological and other chemical based systems. Structure-function relationships are important in understanding, for example, the function of enzymes, cellular communication, and cellular control and feedback mechanisms. Certain macromolecules are known to interact and bind to other molecules having a specific three dimensional spacial and electronic distribution. Any macromolecule having such specificity can be considered a receptor, whether the macromolecule is an enzyme, a protein, a glycoprotein, an antibody, an oligonucleotide sequence of DNA, RNA or the like. The various molecules to which receptors bind are known as ligands.

Pharmaceutical drug discovery is one type of research that relies on the study of structure-function relationships. Much contemporary drug discovery involves discovering novel ligands with desirable patterns of specificity for biologically important receptors. Thus, the time to bring new drugs to market could be greatly reduced through the use of methods and apparatus which allow rapid generation and screening of large numbers of ligands.

A common way to generate such ligands is to synthesize libraries of ligands on solid phase resins. Since the introduction of solid phase synthesis methods for peptides, oligonucleotides, and other polynucleotides, new methods employing solid phase strategies have been developed that are capable of generating thousands, and in some cases millions of individual peptide or nucleic acid polymers using automated or manual techniques. These synthesis strategies, which generate families or libraries of compounds are generally referred to as "combinatorial chemistry" or "combinatorial synthesis" strategies.

The current storage format for compound libraries is a 96 well format well plate typically made from polypropylene and having rubber stopper sheets or hot seal covers. Certain processes and chemistries require that chemical reagents (which may be reactants, solvents, or reactants dissolved in solvents) be kept under inert or anhydrous conditions to prevent reactive groups from reacting with molecular oxygen, water vapor, or other agents. Examples of moisture sensitive chemistries include peptide chemistry, nucleic acid chemistry, organometallic, heterocyclic, and chemistries commonly used to construct combinatorial chemistry libraries. The solvent used for storage of synthesized chemicals is typically dimethylsulfoxide (DMSO).

Storage plates made from polymers have the disadvantage of being incapable of withstanding the extreme temperature variations that are sometimes required in combinatorial chemistry reactions and storage (between −20° and 370° C.).

Creating a multiwell plate from glass is a solution to this and other problems that are inherent in using polymers, such as sample interaction with the base polymer making up the plate. Glass, however cannot be injection molded and it is extremely difficult to press a gob of glass into a 96 well plate mold. One method currently used in producing a multiwell plate from glass involves a boring process. In this process, slabs of borosilicate glass conforming to the industry standard 96 well plate footprint are machined such that 96 individual wells are bored into the slab. This approach however is extremely costly.

Another method of making glass well plates involves vacuum thermoforming. By this method, small plates are produced from glass by vacuum thermoforming a thin glass sheet, as described in commonly assigned French patent application 96-13530. This technique offers well volumes of anywhere from 200μml volume capacity per well. While these volumes may be convenient for high-throughput screening bioassay applications aimed at sample and reagent conservation, they are probably too small for chemical synthesis in organic solvent, the storage of drugs or drug candidates in organic solvent or long term storage where closure is required.

Further, a need for plates having wells having opaque side walls and transparent bottoms has emerged. The transparent well bottoms allow for analytical detection of chemiluminescent, phosphorescent, and luminescent sample tags as used in many chemical and biological tests, experiments and assays. The opaque sidewalls meanwhile serve to prevent crosstalk between neighboring wells and thereby help eliminate any false readings. Plastic plates having wells having opaque side walls and transparent bottoms are commonly sold by many companies including Corning Incorporated and Packard.

SUMMARY OF INVENTION

It is therefore an object of the present invention to provide a multiwell plate that can be manufactured from glass in a cost effective way. Further, it is an object to provide a method of making a glass multiwell plate that can produce varied and unique well designs. It is another object to provide a glass multiwell plate having a high density of wells per unit plate. It is yet another object of the present invention to provide a multiwell plate than can withstand great variations in temperature. It is another object of the present invention to provide a method for making a plate with wells having transparent bottoms and opaque sidewalls. Further it is an object of the present invention to provide a plate having wells having opaque sidewalls and a transparent bottom at least a portion of the plate being composed of glass. It is yet another object of the present invention to provide a multiwell plate with a depth/well diameter ratio far greater than presently available. A further object is to provide a plate that enables increased sensitivity of light detection from its wells.

The present invention relates to a method of making a multiwell plate for use in biological and chemical assays, experimentation and storage. The method comprises the steps of extruding a powdered glass/binder batch mixture through a honeycomb die thereby creating a preform block, sintering the extruded preform, slicing the sintered block into sections, and binding the sliced sections to a substantially flat bottom piece made of either glass or an organic polymer. Alternatively, a polymer may be extruded through a die, slided, and combined with a substantially flat bottom piece made of either glass or an organic polymer.

DETAILED DESCRIPTION OF THE INVENTION

Figure 1:
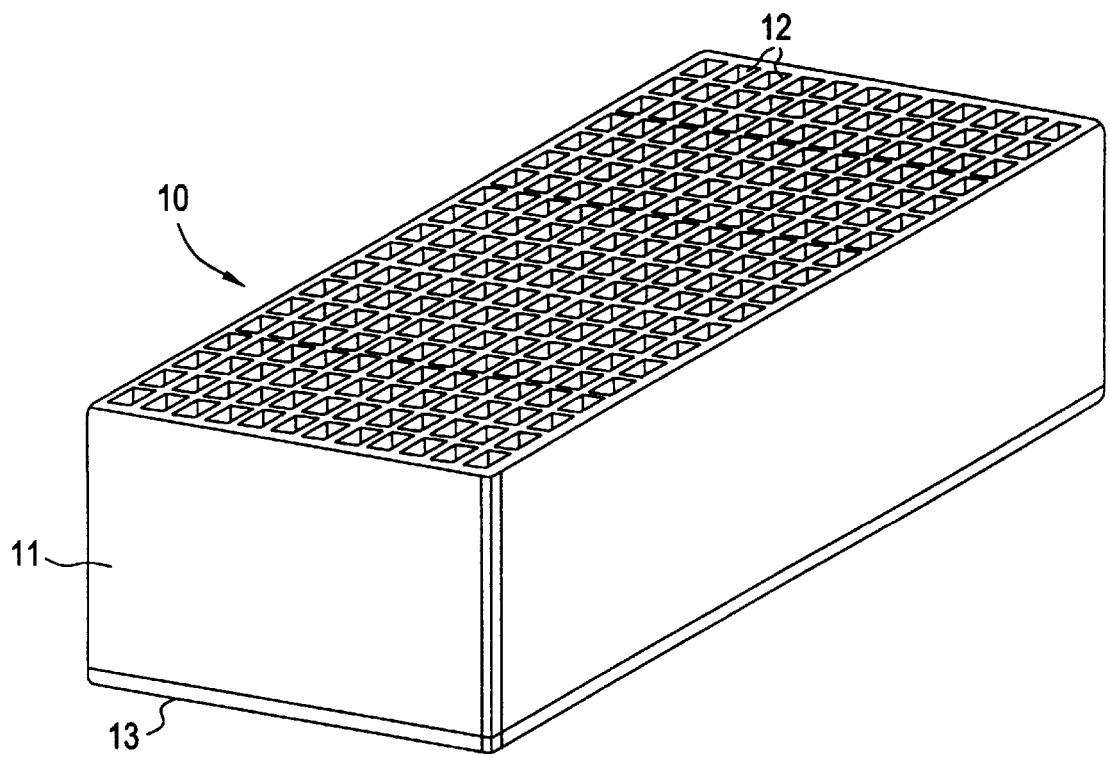
FIG. 1 is a multiwell plate of the present invention.

FIG. 1 the multiwell plate 10 of the present invention. The multiwell plate is comprised of a plurality of sample wells 12 for holding samples, made from a top plate 11 having a plurality of channels therethrough forming the sides of the sample wells, and a bottom plate 13 forming the bottom walls of the sample wells, bonded to the top plate. The plate 10 dimensionally conforms to the industry standard footprint for multiwell plates, namely the width and length dimensions of the plate are preferably standardized at approximately 85 mm and 128 mm, respectively. The height of the plate is preferably greater than the industry for height (14 mm), but can be made any height.

Figure 2:
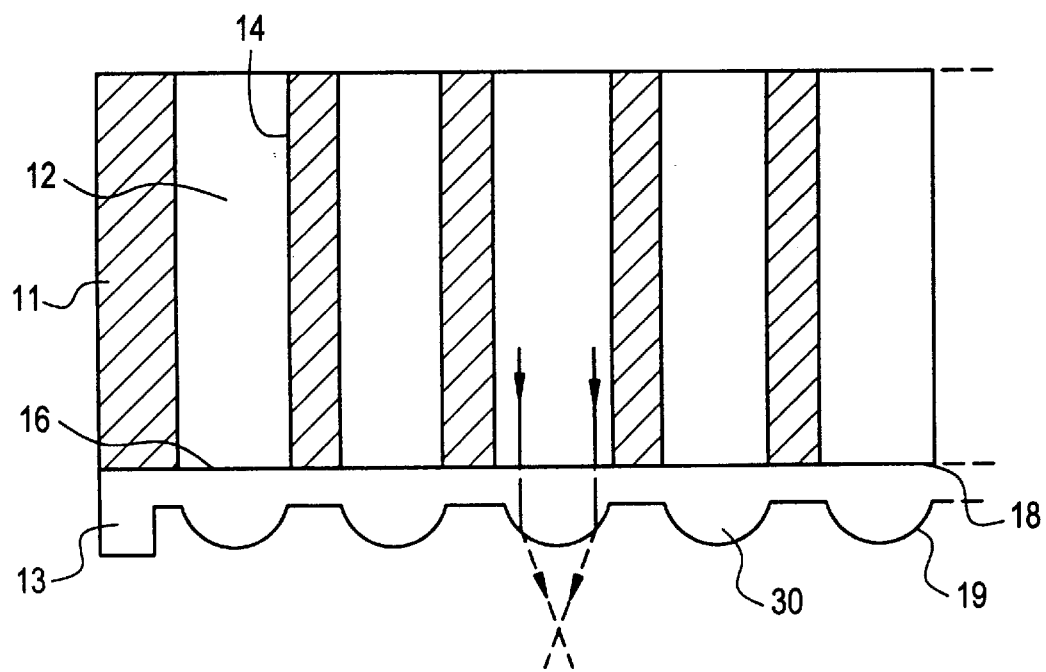
FIG. 2 is a partial cross sectional view one embodiment of the plate of the present invention.

FIG. 2 is an enlarged partial cross section of plate 10. The individual wells 12 have sidewalls 14 and a bottom 16. Preferably, the sidewalls 14 are opaque, while the bottoms 16 are optically transparent. This configuration is important for use with assays that rely on light emissions or light transmissions as reduced by the opaque sidewalls.

The bottom plate 13 has a lower 19 and an upper 18 surface. The upper surface 18 forms the well bottoms 16. The lower surface may be flat or, in a preferred embodiment and as shown in FIG. 5, comprises a matrix of convex microlenses 30, each microlens 30 aligning with a corresponding well bottom 16 such that the peak of the lens is approximately on center with the center point of the well bottom. Through this shaping, the microlens magnifies any sample signal from the well, thereby enhancing detection from a reader located beneath the plate. The microlens is particularly advantageous in wells of very small volume.

While any number of wells may be possible in the disclosed invention, preferably, the plate has greater than 96 wells. Preferably, the number of wells on the plate is a multiple of 96 (i.e., 384, 1536, etc.). Further, the spacing between rows, both in the x and y direction of the plate, is preferably modeled off the industry standard 96 well plate. For example, the preferred spacing between rows for a 384 well plate is one half (approximately 4.5 mm) the center to center spacing between rows of a 96 well plate (approximately 9 mm). Similarly, the spacing for a 1536 well plate is preferably one fourth (approximately 2.25 mm) the center to center row spacing for a 96 well plate. This way, auxiliary equipment such as multiple pipetters or robots designed for use with 96 well plates may be easily adjusted for use with these higher well density plates. Additionally, row numbering for a 384 well plate (16×24 mutually perpendicular rows) and a 1536 well plate (32×48 mutually perpendicular rows) are multiples of a 96 well plate (8×12 mutually perpendicular rows). The sidewalls may be any height, depending on the desired volume per well.

The multiwell plate of the present invention is formed from joining of a top plate 11 and a bottom plate 13, preferably of the same material. However, the bottom plate 13, which forms the well bottom 16 is preferably transparent, while the top plate 11 which forms the sidewalls 14 of the wells 12, is preferably substantially opaque. The two plates, however may be made of different materials, for example, two different glasses, two different polymers, a bottom plate of glass and a top plate of an organic polymer, a top plate of an organic polymer and a bottom plate of glass, or even a bottom plate made from a sheet or film, such as the UV transparent material, ACLAR. Further, the bottom plate may be comprised of a filtering material such as a microporous or track etch membrane.

Obviously, if extreme environmental conditions such as high temperatures or prolonged sample storage are required for particular assays, a plate made entirely of glass, preferably a glass with a high transition temperature, such as alminoborosilicate glass (PYREX7761, for example), is employed.

The method of making the multiwell plate of the preferred invention varies slightly based on the construction materials. For a plate having a top plate made from glass or glass ceramic, the method comprises the following steps: providing an extrudable glass powder and organic binder batch; extruding the batch through a die thereby forming a preform block; sintering the preform block; slicing a section having a substantially identical top and bottom surface and a plurality of open ended channels therethrough from the sintered block; grinding and polishing the top and bottom surface of the section; and, bonding a base plate to the bottom surface.

Figure 3:
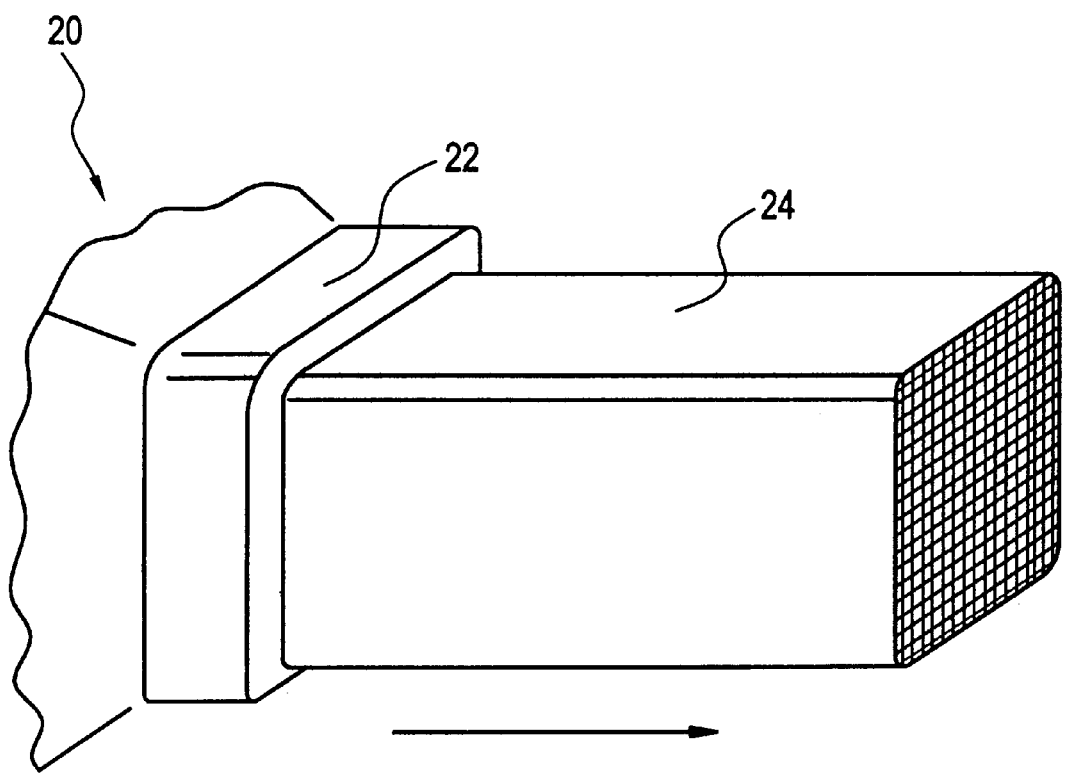
FIG. 3 is perspective view of a block of material being extruded through a die.

In order to form a multi-channeled block from glass, glass ceramic, or ceramic material, one must use a thermoplastic binder such as paraffin wax or a binder as described in U.S. Pat. No. 5,602,197, incorporated herein by reference, and combine it with an inorganic powdered material, preferably PYREX7761 powder with frit size centered on 10 $\mu$m thereby forming an extrudable batch mixture. This organic/inorganic mixture is then extruded through a twin screw extruder 20 as shown in FIG. 3, operated at room temperature. A die 22 determines the dimensions of the extruded material or preform 24. Preferably, a 2–7 inch diameter, square or round channeled, monolithic honeycomb preform with 15–40 mil channel walls and 20–400 cells per square inch of frontal area results from the extrusion. The preform may be extended in any shape including round, rectangular or square cross sectional shape. The preform is next sintered to fuse the powder and expunge the binder. In order to control wall sagging, sintering conditions must be closely monitored. Sintering temperature for PYREX7761 is approximately 675° C. At this temperature, glass particle binding occurs and 10–15% shrinkage uniformly occurs throughout the structure. What remains is a glass, glass ceramic, or ceramic depending on the sintering schedule and the composition of the original powder material. For use with this invention, preferably the firing schedule and power composition should be modified in such a way as to create substantially identical channel walls of high density and low porosity.

Once the preform is sintered, the resulting block may be sliced for the desired well depth. The block is cut into sections in a plane substantially perpendicular to the direction that the block was extruded such that the top and bottom surfaces of the cut section are substantially identical. The cut sections are preferably between 12–40 mm in thickness, but may be any width. The cutting is preferably performed by diamond saw, for example, under internal water flux in order to prevent any glass chips or fragments from lodging in the channels. The cut sections are used as the top plate in the multiwell plate formation.

It should be mentioned, that the preform block itself may be cut prior to sintering to achieve the same result, i.e. a glass section having a plurality of open ended channels therethrough.

In a preferred embodiment, the cut section, which forms the top plate, may be ground and polished on both the top and bottom.

In order to make a top plate from an organic polymer according to the method, a thermoplastic polymer is initially extruded through a twin screw extruder and die operating at the melting temperature of the thermoplastic material, for example, polypropylene is extruded at approximately 180° C. A multi-channeled polymer block results. As in the glass extrusion embodiment, the target cell density and wall thickness of the resultant block is substantially variable as defined by the die. Alternatively, a room temperature extrusion of a slurry made from a polymer powder, which is subsequently sintered, may also be accomplished.

Both extrusion of the polymer and the powdered glass is preferably performed by a vertical extrusion process. Vertical extrusion helps reduce problems of wall sagging due to gravitational effects. However, a horizontal extrusion process may be preferred in a mass production setting.

The polymer block is cut into sections after cooling by using an extremely sharp standard cutting blade to ensure a clean cut through the channels of the polymer block. The cut section contains a plurality of open ended channels. The cut section is used as the top plate which, when combined with the bottom plate, forms the multiwell plate of the present invention. Advantageously, the cutting is performed well below the polymer glass transition temperature, for example, at −20° C. for polypropylene using any standard cutting blade.

The bottom plate may be constructed of any material, and although preferred, doesn't need to be made of the same material as the top plate. In a preferred embodiment, the bottom plate is shaped by the contactless pressing technique described in U.S. Pat. No. 5,623,368, incorporated herein by reference. By using this method, an array of microlenses can be formed in the bottom surface of the bottom plate and align such that each microlens is centered with a channel from the top plate, as shown in FIG. 2. This way, in a finished multiwell plate, each well bottom is a microlens capable of amplifying light signal from sample within the well.

The bottom plate may further take the form of a transparent sheet of material, such as sheet of polystyrene or ACLAR.

Bonding the top plate and bottom plate may be accomplished by any of several methods known in the art. In choosing a bonding method, the materials to be bonded must be considered. For example, in bonding a top plate and bottom plate both made of polystyrene, ultrasonic welding, heat sealing, or gluing may all be employed. In joining an upper plate and lower plate both made of glass, fusing at an appropriate temperature or frit sealing is preferred.

The method described allows for multiwell plates having well depths that either cannot or are extremely difficult to achieve with standard injection molding techniques. In fact, the multiwell plate of the present invention may have a ratio of well depth to well diameter or pitch of greater than 5:1.

It may be further contemplated that for the construction of plates with a very high well density, the extruded block, whether it be sintered glass or an organic polymer, may be redrawn into a section of substantially uniform proportion. The redrawn block section is then sectioned into pieces for use as a top plate, as previously described. If the top plate is made of glass, the redraw process preferably occurs after the preform is sintered (although it may occur prior to sintering). The sintered and cooled multi-channeled block is reheated and undergoes a redraw reduction. Redraw takes place approximately at the glass transformation temperature. If the top plate is an organic polymer, the redraw of the extruded polymer block will preferably take place at room temperature, but may require external heating of the structure to 150° C., for example. The redraw of an extruded polymer block may also require internal heating of the polymer structure by means of forced heated air, for example, in order to preclude any internal heating gradient within the block during redraw. Although the extrusion has been demonstrated with a polyolefin, specifically, polypropylene, it should be understood that any thermoplastic polymer, as recognized by one skilled in the art, may be used for this process.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of making a biological or chemical assay multiwell plate having wells with substantially opaque sidewalls and optically transparent bottoms comprising the steps of:
   (a) providing an extrudable glass powder and organic binder batch;
   (b) extruding said batch through a die thereby forming a preform block;
   (c) sintering said preform block;
   (d) slicing a section having a substantially identical top and bottom surface and a plurality of open ended channels therethrough from said sintered block; and
   (e) bonding a base plate to said bottom surface.

2. The method of claim 1 further comprising the step of grinding and polishing the top and bottom surface prior to bonding.

3. The method of claim 1 wherein said section is 12–40 mm in thickness.

4. The method of claim 1 wherein said base plate has a plurality of microlenses formed therein such that each microlens aligns and fits with a channel from said section.

5. The method of claim 1 wherein said base plate is made of an optically transparent material.

6. The method of claim 1 wherein said base plate is made from glass.

7. The method of claim 1 wherein said base plate is made from an organic polymer.

8. A method of making a biological or chemical assay multiwell plate having wells with substantially opaque sidewalls and optically transparent bottoms comprising the steps of:
   (a) extruding an organic polymer through a die forming an extrudate in a predetermined direction, said extrudate having a plurality of channels therein;
   (b) cutting a section from said extrudate in a plane substantially perpendicular to the direction of extrusion, said section having a plurality of open ended channels therethrough;
   (c) bonding said section to a base plate.

9. The method of claim 8 wherein said section is 12–40 mm in thickness.

10. The method of claim 8 whereby said base plate is made from an organic polymer.

11. The method of claim 8 wherein said base plate is a filter membrane.

12. The method of claim 8 whereby said bonding is accomplished by ultrasonic bonding.

13. The method of claim 8 whereby said bonding is accomplished by heat fusion.

14. The method of claim 8 whereby said base plate is optically transparent.

15. The method of claim 8 whereby said base plate is a transparent film.

16. The method of claim 8 whereby said baseplate has lower surface having a plurality of microlenses protruding therefrom such that at least one microlens aligns with a channel from said section.

17. The method of claim 8 wherein said base plate is made from glass.

* * * * *